(12) United States Patent
Kondo et al.

(10) Patent No.: US 12,515,326 B2
(45) Date of Patent: Jan. 6, 2026

(54) METHOD FOR CONTROLLING ROBOT AND ARM

(71) Applicant: FUJI CORPORATION, Chiryu (JP)

(72) Inventors: Shinya Kondo, Okazaki (JP); Naofumi Yoshida, Obu (JP)

(73) Assignee: FUJI CORPORATION, Chiryu (JP)

( * ) Notice: Subject to any disclaimer, the term of this patent is extended or adjusted under 35 U.S.C. 154(b) by 107 days.

(21) Appl. No.: 18/568,890

(22) PCT Filed: Jun. 24, 2021

(86) PCT No.: PCT/JP2021/023922
§ 371 (c)(1),
(2) Date: Dec. 11, 2023

(87) PCT Pub. No.: WO2022/269850
PCT Pub. Date: Dec. 29, 2022

(65) Prior Publication Data
US 2024/0269840 A1 Aug. 15, 2024

(51) Int. Cl.
*B25J 9/16* (2006.01)

(52) U.S. Cl.
CPC .......... *B25J 9/1633* (2013.01); *B25J 9/1653* (2013.01); *B25J 9/1666* (2013.01)

(58) Field of Classification Search
CPC ...... B25J 9/1633; B25J 9/1653; B25J 9/1666; B25J 9/1676; B25J 13/085; G05B 2219/39529; G05B 2219/40201; G05B 2219/40202; G05B 2219/40541
See application file for complete search history.

(56) References Cited

U.S. PATENT DOCUMENTS

| | | | |
|---|---|---|---|
| 2015/0290809 A1 | 10/2015 | Nakagawa et al. | |
| 2016/0008978 A1 | 1/2016 | Oguri | |
| 2020/0030992 A1* | 1/2020 | Motoyoshi | B25J 9/1676 |
| 2020/0086482 A1* | 3/2020 | Johnson | B25J 9/1653 |
| 2023/0249334 A1 | 8/2023 | Inagaki et al. | |

FOREIGN PATENT DOCUMENTS

| | | |
|---|---|---|
| JP | 2010-524548 A | 7/2010 |
| WO | WO 2020/045483 A1 | 3/2020 |
| WO | WO 2021/075031 A1 | 4/2021 |

OTHER PUBLICATIONS

International Search Report issued Sep. 14, 2021, in PCT/JP2021/023922, filed on Jun. 24, 2021, 2 pages.

* cited by examiner

*Primary Examiner* — Dylan M Katz
(74) *Attorney, Agent, or Firm* — Oblon, McClelland, Maier & Neustadt, L.L.P.

(57) ABSTRACT

A control device is configured to control a driving device so that an arm operates in accordance with an instruction operation, and detect a collision with another object with respect to a part where an external force is greater than a threshold value among parts of the arm. At this time, the control device switches the threshold value between a case where the instruction operation is a non-contact intentional operation that is not intended for contact with another object and a case where the instruction operation is a contact intentional operation that is intended for contact with another object.

5 Claims, 5 Drawing Sheets

METHOD FOR CONTROLLING ROBOT AND ARM

TECHNICAL FIELD

The present description discloses a method for controlling robot and an arm.

BACKGROUND ART

Conventionally, a robot including an arm, a driving device for driving the arm, and a control device for controlling the driving device has been proposed (for example, refer to Patent Literature 1). In this robot, the control device controls the driving device so that the arm operates in accordance with an instruction operation.

PATENT LITERATURE

Patent Literature 1: WO2021/075031

BRIEF SUMMARY

Technical Problem

In such a robot, there is a case where a collision detection function of detecting a collision with another object for a part where an external force acting from another object among parts of the arm is greater than a threshold value is provided. In this case, when the threshold value is uniform regardless of whether the instruction operation is an operation that is intended for contact with another object, there is a possibility that a collision with another object is erroneously detected.

A main object of the present disclosure is to suppress erroneous detection of a collision with another object.

Solution to Problem

The present disclosure employs the following means in order to achieve the main object described above.

A robot according to the present disclosure includes: an arm;
  a driving device configured to drive the arm;
  an external force detection section configured to detect external forces acting on parts of the arm from another object; and
  a control device configured to control the driving device so that the arm operates in accordance with an instruction operation, and detect a collision with the other object for a part where the external force is greater than a threshold value among the parts,
  in which the control device configured to switch the threshold value between a case where the instruction operation is a non-contact intentional operation that is not intended for contact with the other object and a case where the instruction operation is a contact intentional operation that is intended for contact with the other object.

In the robot of the present disclosure, the control device is configured to control the driving device so that the arm operates in accordance with an instruction operation, and detect a collision with another object for a part where the external force is greater than the threshold value among the parts of the arm. At this time, the control device switches the threshold value between a case where the instruction operation is a non-contact intentional operation that is not intended for contact with another object and a case where the instruction operation is a contact intentional operation that is intended for contact with another object. Accordingly, it is possible to suppress erroneous detection of a collision with another object for the parts of the arm.

DESCRIPTION OF EMBODIMENTS

Figure 1:
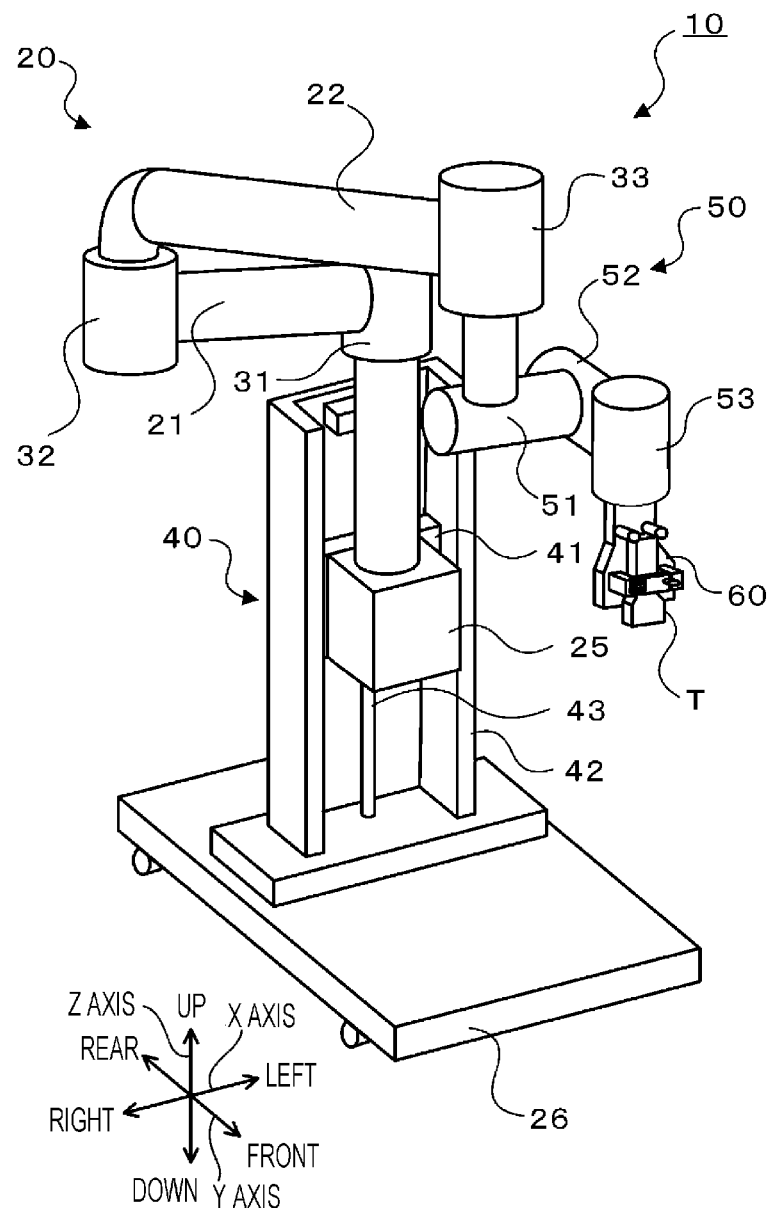
FIG. 1 is an external perspective view of a robot.
Figure 2:
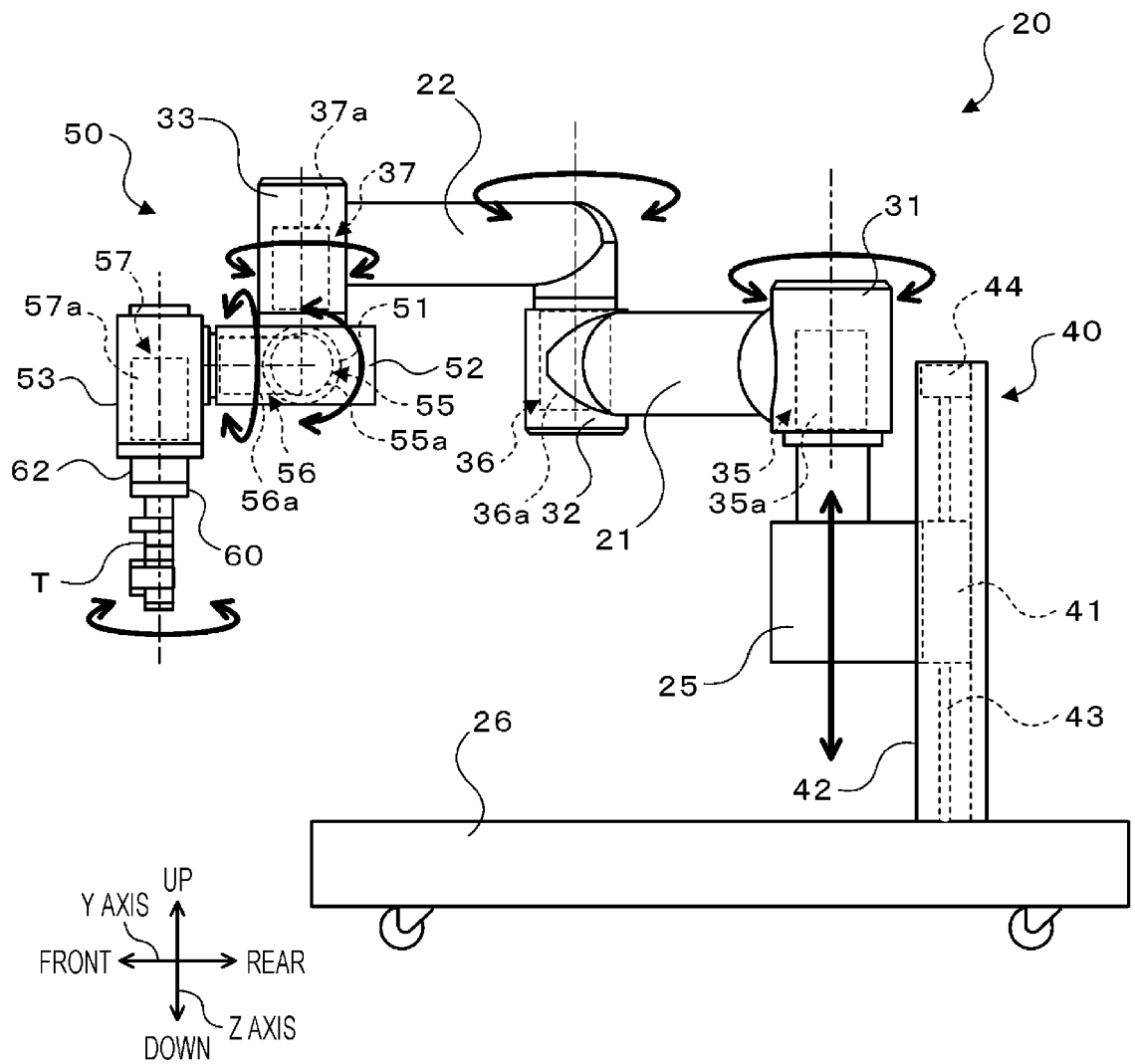
FIG. 2 is a side view of a robot main body.
Figure 3:
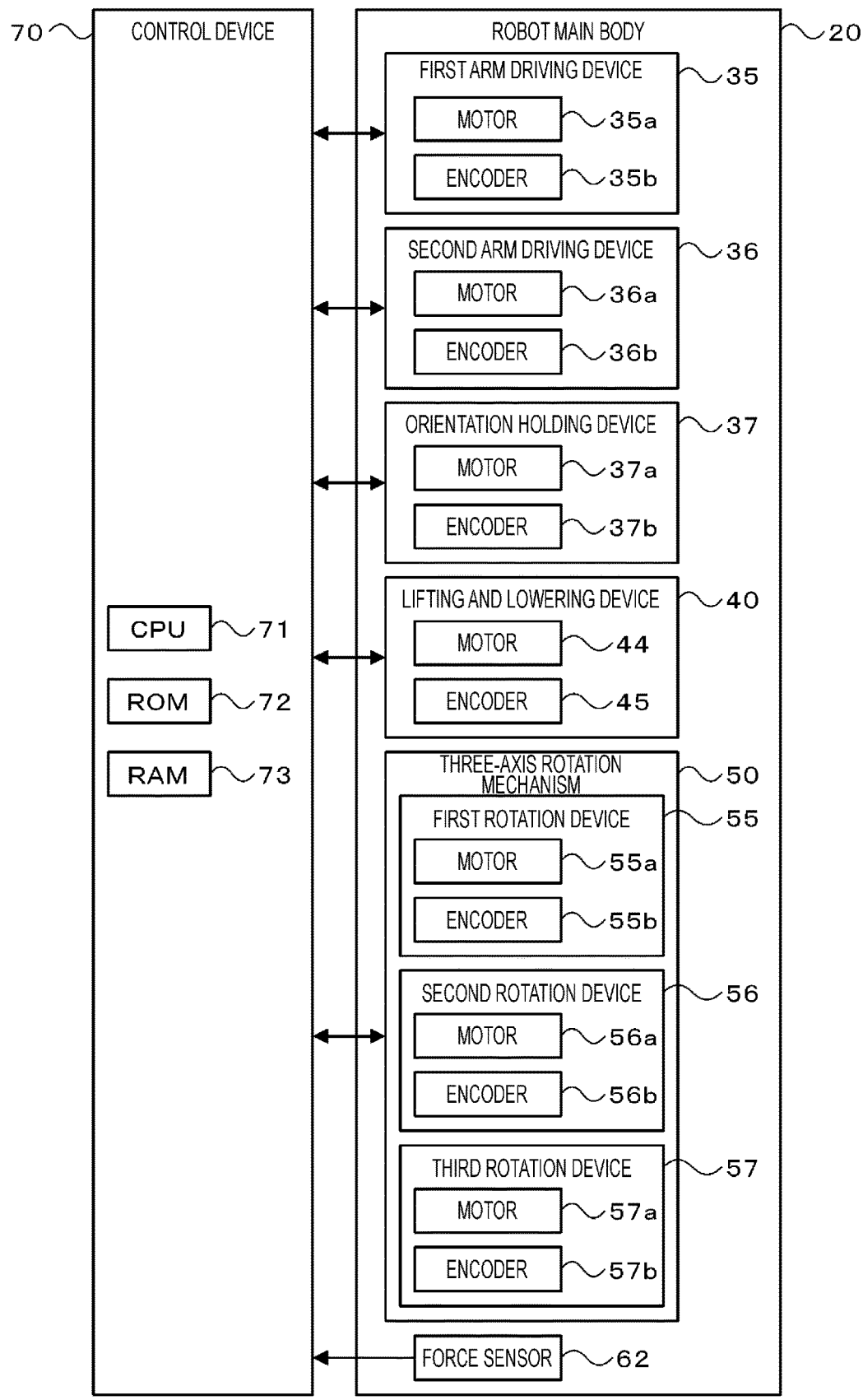
FIG. 3 is a block diagram illustrating an electrical connection relationship between the robot main body and a control device.

Hereinafter, an embodiment of the present disclosure will be described with reference to the accompanying drawings. FIG. 1 is an external perspective view of robot 10 of the present embodiment. FIG. 2 is a side view of robot main body 20. FIG. 3 is a block diagram illustrating an electrical connection relationship between robot main body 20 and control device 70. In FIG. 1, a left-right direction is an X axis, a front-rear direction is a Y-axis direction, and an up-down direction is a Z-axis direction.

As illustrated in FIGS. 1 to 3, robot 10 of the present embodiment includes robot main body 20 and control device 70 that controls robot main body 20. As illustrated in FIG. 2, robot main body 20 includes first arm 21, second arm 22, base 25, base plate 26, first arm driving device 35, second arm driving device 36, orientation holding device 37, lifting and lowering device 40, three-axis rotation mechanism 50, holder 60, and force sensor 62. First arm 21, second arm 22, and three-axis rotation mechanism 50 may be simply referred to as an arm.

The base end portion of first arm 21 is coupled to base 25 via first joint shaft 31 extending in the up-down direction (Z-axis direction). First arm driving device 35 includes motor 35a that rotationally drives first joint shaft 31, and encoder 35b that detects rotation angle $\theta m1$ of motor 35a (refer to FIG. 3). First arm driving device 35 causes first arm 21 to rotate (pivot) along a horizontal plane (XY plane) around first joint shaft 31 as a fulcrum by rotationally driving first joint shaft 31 by motor 35a.

The base end portion of second arm 22 is coupled to the tip end portion of first arm 21 via second joint shaft 32 extending in the up-down direction. Second arm driving device 36 includes motor 36a that rotationally drives second joint shaft 32, and encoder 36b that detects rotation angle $\theta m2$ of motor 36a (refer to FIG. 3). Rotation shaft of motor 36a is connected to second joint shaft 32 via a deceleration device (not illustrated). Second arm driving device 36 causes second arm 22 to rotate (pivot) along a horizontal plane around second joint shaft 32 as a fulcrum by rotationally driving second joint shaft 32 by motor 36a.

Base 25 is provided to be lifted and lowered with respect to base plate 26 by lifting and lowering device 40 installed on base plate 26. As illustrated in FIGS. 1 and 2, lifting and lowering device 40 includes slider 41 fixed to base 25, guide member 42 fixed to base plate 26 and extending in the up-down direction to guide the movement of slider 41, ball screw shaft 43 (lifting and lowering shaft) extending in the up-down direction and screwed into a ball screw nut (not illustrated) fixed to slider 41, motor 44 for rotationally driving ball screw shaft 43, and encoder 35b (refer to FIG. 3). Lifting and lowering device 40 causes base 25, fixed to slider 41, to move in the up-down direction along guide member 42 by rotationally driving ball screw shaft 43 by motor 44. Encoder 45 detects position Hs in the up-down direction (lifting and lowering position) of slider 41 (base 25).

Orientation holding device 37 is a device that holds the orientation of three-axis rotation mechanism 50 (the direction of first rotation shaft 51) in a fixed direction regardless of the orientations of first arm 21 and second arm 22. Orientation holding device 37 includes motor 37a that rotationally drives orientation holding shaft 33 to which three-axis rotation mechanism 50 is coupled and extending in the up-down direction, and encoder 37b that detects rotation angle θm3 of motor 37a (refer to FIG. 3).

Three-axis rotation mechanism 50 is coupled to the tip end portion of second arm 22 via orientation holding shaft 33. Three-axis rotation mechanism 50 includes first rotation shaft 51, second rotation shaft 52, and third rotation shaft 53 that are orthogonal to each other, first rotation device 55 that rotates first rotation shaft 51, second rotation device 56 that rotates second rotation shaft 52, and third rotation device 57 that rotates third rotation shaft 53. First rotation shaft 51 is supported in an orientation orthogonal to orientation holding shaft 33. Second rotation shaft 52 is supported in an orientation orthogonal to first rotation shaft 51. Third rotation shaft 53 is supported in an orientation orthogonal to second rotation shaft 52. Holder 60 for holding tool T is attached to a lower end surface of third rotation shaft 53 via force sensor 62. In the present embodiment, tool T is held by holder 60 to be coaxial with third rotation shaft 53. First rotation device 55 includes motor 55a that rotationally drives first rotation shaft 51, and encoder 55b (refer to FIG. 3) that detects rotation angle θm4 of motor 55a. Second rotation device 56 includes motor 56a that rotationally drives second rotation shaft 52, and encoder 56b (refer to FIG. 3) that detects rotation angle θm5 of motor 56a. Third rotation device 57 includes motor 57a that rotationally drives third rotation shaft 53, and encoder 57b (refer to FIG. 3) that detects rotation angle θm6 of motor 57a.

Force sensor 62 is attached between third rotation shaft 53 of three-axis rotation mechanism 50 and holder 60, and detects a force component acting in each axial direction of the X axis, the Y axis, and the Z axis and a torque component acting around each axis as external forces acting on third rotation shaft 53, holder 60, and tool T from another object outside robot 10.

As illustrated in FIG. 3, control device 70 is configured as a microcomputer having CPU 71, ROM 72, RAM 73, a flash memory, and input and output ports (not illustrated). Detection signals from respective encoders 35b, 36b, 37b, 45, 55b, 56b, 57b, the detection signal from force sensor 62, and the like are input to control device 70 via input ports. In addition, a drive control signal to each of motors 35a, 36a, 37a, 44, 55a, 56a, and 57a is output from control device 70 via output ports.

In robot 10 of the present embodiment configured as described above, third rotation shaft 53, that is, tool T can be moved to any position in any orientation with a combination of the translational movement in three directions of the X-axis direction, the Y-axis direction, and the Z-axis direction by first arm driving device 35, second arm driving device 36, and lifting and lowering device 40, and the rotational movement in three directions, around the X axis (pitching), around the Y axis (rolling), and around the Z axis (yawing), by three-axis rotation mechanism 50. With this, robot 10 can perform necessary work using tool T. Examples of the work by robot 10 can include work of pressing tool T against the body surface of the subject in a case where tool T is an ultrasonic probe.

The operation of robot 10, specifically, the control of robot main body 20 by control device 70 will be described. Control device 70 (CPU 71) sets a target position and a target orientation of the arm (first arm 21, second arm 22, and three-axis rotation mechanism 50) that holds tool T in accordance with the instruction operation based on a program set in advance, an instruction by a user, or the like. Subsequently, CPU 71 individually sets target rotation angle θm1* of first joint shaft 31, target rotation angle θm2* of second joint shaft 32, target rotation angle θm3* of orientation holding shaft 33, target lifting and lowering position Hs* of base 25, target rotation angle θm4* of first rotation shaft 51, target rotation angle θm5* of second rotation shaft 52, and target rotation angle θm6* of third rotation shaft 53 at each time, in order to move the arm to the target position in the target orientation. Then, CPU 71 sets torque commands Tm1* to Tm6* and Tmh* for motors 35a, 36a, 37a, 55a, 56a, 57a, and 44 through feedback control so that rotation angles θm1 to θm6 or lifting and lowering position Hs detected by encoders 35b, 36b, 37b, 55b, 56b, and 57b or encoder 45 correspond to respective target rotation angles θm1* to θm6* or target lifting and lowering position Hs* at each corresponding time. In addition, CPU 71 controls motors 35a, 36a, 37a, 55a, 56a, 57a, and 44 so that motors 35a, 36a, 37a, 55a, 56a, 57a, and 44 are driven by corresponding torque commands Tm1* to Tm6* and Tmh*, respectively. Torque command Tm1* for motor 35a is obtained by Equation (1) using an angle difference 40 ml obtained by subtracting rotation angle θm1 from target rotation angle θm1* and gains kp1 and ki1 of the proportional term and the integral term. Torque commands Tm2* to Tm6* for motors 36a, 37a, 55a, 56a, and 57a are obtained in the same manner as torque command Tm1* for motor 35a. Torque command Tmh* for motor 44 is obtained by Equation (2) using position difference ΔHs obtained by subtracting lifting and lowering position Hs from target lifting and lowering position Hs* and gains kph and kih of the proportional term and the integral term.

$$Tm1* = kp1 \cdot (\theta m1* - \theta m1) + ki1 \cdot \int (\theta m1* - \theta m1)dt \quad (1)$$

$$Tmh* = kph \cdot (Hs* - Hs) + kih \cdot \int (Hs* - Hs)dt \quad (2)$$

Here, regardless of the orientations of first arm 21 and second arm 22, control device 70 sets target rotation angle θm3* of orientation holding shaft 33 so that the axial direction of first rotation shaft 51 is always in the left-right direction (X-axis direction), and controls motor 44 so that rotation angle θm3 detected by encoder 45 matches target rotation angle θm3*. Target rotation angle θm3* of orientation holding shaft 33 can be set based on rotation angle θm1 of first joint shaft 31 detected by encoder 35b and rotation angle θm2 of second joint shaft 32 detected by encoder 36b. With this, CPU 71 can independently perform the control of the translational movement in the three directions and the control of the rotational movement in the three directions described above, so that the control is facilitated.

Next, the operation of robot 10 of the present embodiment, in particular, the operation when detecting a collision between parts of the arm of robot main body 20 and another object (such as an operator) will be described. Examples of parts of the arm can include parts of first arm 21, parts of second arm 22, parts of first rotation shaft 51, parts of second rotation shaft 52, and parts of third rotation shaft 53. Parts of first arm 21 are, for example, two parts (parts on the front side and the rear side in the rotation direction) obtained by dividing the outer peripheral surface of first arm 21 into two parts by a plane including each of the central axes of first joint shaft 31 and first arm 21. Parts of second arm 22 are, for example, two parts (parts on the front side and the rear side in the rotation direction) obtained by dividing the outer peripheral surface of second arm 22 into two parts by a plane including each of the central axes of second joint shaft 32 and second arm 22. Parts of first rotation shaft 51 are, for example, two parts (parts on the front side and the rear side in the rotation direction) obtained by dividing the outer peripheral surface of first rotation shaft 51 into two parts by a plane including each of the central axes of orientation holding shaft 33 and first rotation shaft 51. Parts of second rotation shaft 52 are, for example, two parts (parts on the front side and the rear side in the rotation direction) obtained by dividing the outer peripheral surface of second rotation shaft 52 into two parts by a plane including each of the central axes of first rotation shaft 51 and second rotation shaft 52. Parts of third rotation shaft 53 are, for example, at least two parts whose a lower end surface (end surface on tool T side), an upper end surface, and an outer peripheral surface of third rotation shaft 53 are divided by at least one plane including the central axis of the third rotation shaft 53.

Figure 4:
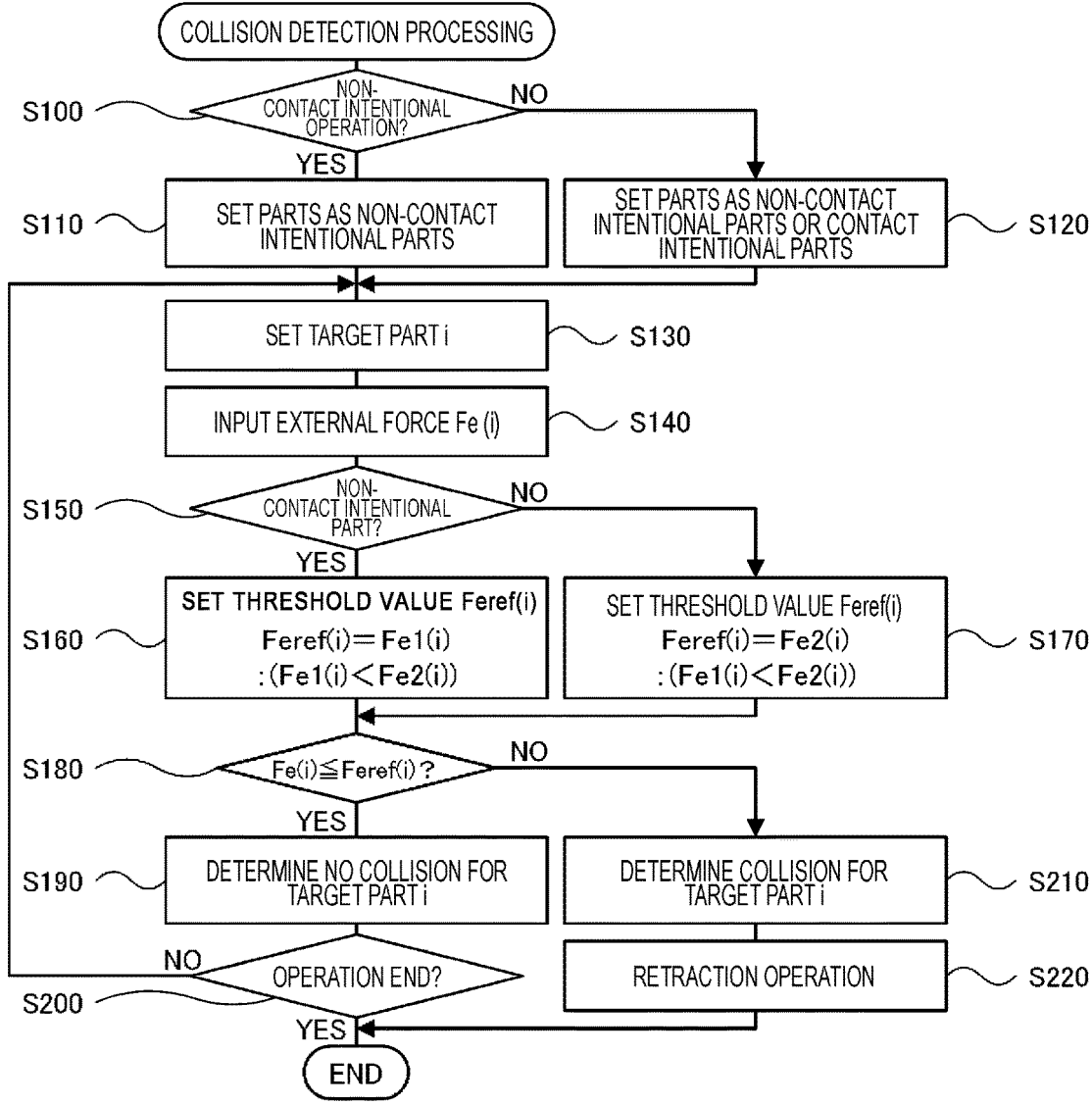
FIG. 4 is a flowchart illustrating an example of collision detection processing.

FIG. 4 is a flowchart illustrating an example of collision detection processing executed by CPU 71 of control device 70. This routine is executed when the operation of the arm is started in accordance with the instruction operation. In the following description, a case where an ultrasonic probe is used as tool T will be described.

When the collision detection processing in FIG. 4 is executed, CPU 71 first determines whether the instruction operation is a non-contact intentional operation that is not intended for contact with another object, or a contact intentional operation that is intended for contact with another object (S100). Here, examples of the non-contact intentional operation can include a preparation operation before tool T is pressed against the body surface of the subject. Examples of the preparation operation can include an operation of moving tool T to the work start position while bringing the arm into the work start orientation. Examples of the contact intentional operation can include an operation of pressing tool T against the body surface of the subject, and an operation when it is assumed that the operator touches tool T. When it is assumed that the operator touches tool T, examples can include when cleaning tool T, adjusting the position of tool T, and checking or changing the routing of wiring (not illustrated) extending from tool T.

In a case where CPU 71 determines that the instruction operation is a non-contact intentional operation, CPU 71 sets all of the parts of the arm to non-contact intentional parts that are not intended for contact with another object (S110). On the other hand, in a case where CPU 71 determines that the instruction operation is a contact intentional operation, CPU 71 sets the parts of the arm to non-contact intentional parts or contact intentional parts that are intended for contact with another object (S120). For example, in a case where the instruction operation is an operation of pressing tool T against the body surface of the subject as a contact intentional operation, since it is assumed that an intended external force (contact force) in the axial direction of third rotation shaft 53 acts on the lower end surface of third rotation shaft 53 (end surface on tool T side) via tool T and force sensor 62 from the body surface of the subject, the lower end surface of third rotation shaft 53 is set as the contact intentional part among the parts of the arm and the other parts of the arm are set as non-contact intentional parts.

Subsequently, CPU 71 sets target part i for determining the presence or absence of a collision with another object among the parts of the arm (S130), and inputs external force Fe(i) acting on target part i from another object (S140). Here, external forces Fe acting on the parts of the arm can be detected as follows, for example.

External forces Fe acting on parts of first arm 21 are obtained based on, for example, the deviation from torque command Tm1* for motor 35a with respect to reference torque Tm1r. Reference torque Tm1r is torque command Tm1* for motor 35a assumed when no external force acts on first arm 21, and is estimated based on, for example, angle difference $\Delta\theta m1$ ($=\theta m1^* - \theta m1$). When the rotation of first arm 21 is more limited by another object, the absolute value of angle difference $\Delta\theta m1$ becomes larger than expected, and as can be seen from the Equation (1), torque command Tm1* has the same sign as reference torque Tm1r and a larger absolute value than reference torque Tm1r. On the other hand, when the rotation of first arm 21 is accelerated by another object, the absolute value of angle difference 40 ml becomes smaller than expected, and as can be seen from the Equation (1), torque command Tm1* has the same sign as reference torque Tm1r and a smaller absolute value than reference torque Tm1r or has a different sign. In first arm 21 having a part on the front side (rotation front side part) and a part on the rear side (rotation rear side part) in the rotation direction of first arm 21, in a case where torque command Tm1* is equal to reference torque Tm1r, it is assumed that external force Fe does not act on any of the rotation front side part and the rotation rear side part of first arm 21, and in a case where torque command Tm1* has the same sign as reference torque Tm1r and a larger absolute value than reference torque Tm1r, it is assumed that external force Fe acts on the rotation front side part of first arm 21, and in a case where torque command Tm1* has the same sign as reference torque Tm1r and a smaller absolute value than reference torque Tm1r or has a different sign, it is assumed that external force Fe acts on the rotation rear side part of first arm 21. From these, external forces Fe acting on parts of first arm 21 can be obtained using torque command Tm1* for motor 35a. Similarly, external forces Fe acting on parts of second arm 22 are obtained by using torque command Tm2* for motor 36a, external forces Fe acting on parts of first rotation shaft 51 are obtained by using torque command Tm3* for motor 37a, and external forces Fe acting on parts of second rotation shaft 52 are obtained by using torque command Tm4* for motor 55a. External forces Fe acting on parts (parts in the circumferential direction of the lower end surface, the upper end surface, and the outer peripheral surface) of third rotation shaft 53 are obtained based on the detection value of force sensor 62.

Then, CPU 71 determines whether target part i is a non-contact intentional part or a contact intentional part (S150). In a case where CPU 71 determines that target part i is a non-contact intentional part, CPU 71 sets value Fe1(i) to threshold value Feref(i) for collision determination for target part i (S160). On the other hand, in a case where CPU 71 determines that target part i is a contact intentional part, CPU 71 sets value Fe2(i) greater than value Fe1(i) to threshold value Feref(i) for target part i (S170). The processing in S160 and S170 is processing of switching threshold value Feref(i) based on whether target part (i) is a non-contact intentional part or a contact intentional part. For example, about several tens of Nm is used as value Fe1(i), and about 1.5 times to 3 times value Fe1(i) is used as value Fe2(i). As value Fe1(i) or value Fe2(i), a different value may be used for each target part i, or a uniform value may be used. According to this, the processing in S160 and S170 can also be said to be processing of switching threshold value Feref(i) between the non-contact intentional parts and the contact intentional parts among the parts of the arm.

Further, CPU 71 determines whether external force Fe(i) acting on target part i is greater than threshold value Feref(i) (S180). In a case where CPU 71 determines that external force Fe(i) acting on target part i is equal to or less than threshold value Feref(i), CPU 71 determines that a collision with another object does not occur for target part i (S190), and determines whether to end the operation of the arm in accordance with the instruction operation (S200). In a case where CPU 71 determines not to end the operation of the arm, processing returns to S130. In a case where CPU 71 repeatedly executes the processing from S130 to S200 and determines to end the operation of the arm in S200, CPU 71 ends this routine.

In a case where CPU 71 determines that external force Fe(i) acting on target part i is greater than threshold value Feref(i) in S180 while repeatedly executing the processing from S130 to S200, CPU 71 determines that a collision with another object occurs for target part i (S210), stops the instruction operation, performs the retraction operation (S220), and ends the routine. CPU 71 controls the corresponding motor among motors 35a, 36a, 37a, 44, 55a, 56a, 57a, and 44 so that the arm operates an operation of moving target part i away from another object so that external force Fe(i) acting on target part i (part where the collision is detected) becomes small (for example, becomes a value of 0), as the retraction operation.

In this manner, CPU 71 determines the presence or absence of a collision for target part i by comparing external force Fe(i) and threshold value Feref(i) for target part i while changing target part i with respect to the parts of the arm. At this time, threshold value Feref is switched between a case where the parts of the arm become non-contact intentional parts and a case where the parts of the arm become contact intentional parts, and threshold value Feref is switched between the non-contact intentional parts and the contact intentional parts among the parts of the arm. Since external force Fe on the contact intentional part may include contact force Ft (intended force) acting caused by the instruction operation, erroneous detection of a collision with another object can be suppressed by setting the threshold value Feref for the parts of the arm in this way.

Here, an example correspondence relationship between elements of the embodiment and elements of the present disclosure will be described. That is, first arm 21, second arm 22, first rotation shaft 51, second rotation shaft 52, and third rotation shaft 53 of the present embodiment correspond to the arm of the present disclosure, motors 35a, 36a, 37a, 55a, 56a, 57a, and 44 correspond to the driving device, and control device 70 corresponds to the control device.

It is needless to say that the present disclosure is not limited in any way to the above-described embodiment, and the present disclosure can be embodied in various aspects as long as the aspects fall within the technical scope of the present disclosure.

For example, in the above-described embodiment, CPU 71 estimates external forces Fe acting on parts of first arm 21 based on the deviation from torque command Tm1* for motor 35a with respect to reference torque Tm1r. However, CPU 71 may use torque Tm1 of motor 35a instead of torque command Tm1*. In a case where second arm driving device 36 includes a torque sensor that detects the torque of motor 35a, torque Tm1 may be detected by the torque sensor. CPU 71 may use values obtained by subjecting slow change processing such as smoothing processing or rate processing to torque command Tm1* or torque Tm1. CPU 71 may use torque command Tm1* or torque Tm1, and change amount $d\theta m1$ per unit time of rotation angle $\theta m1$ of motor 35a detected by encoder 35b. This is because when motor 35a is driven by the same torque command Tm1*, change amount $d\theta m1$ is affected by the presence or absence of a collision with another object. First arm 21 may include a force sensor, and CPU 71 may use a detection value of the force sensor. The estimation of external forces Fe acting on parts of second arm 22, parts of first rotation shaft 51, and parts of second rotation shaft 52 can be considered in the same manner as the estimation of external forces Fe acting on parts of first arm 21.

In the above-described embodiment, CPU 71 estimates external forces Fe acting on parts (parts in the circumferential direction of the lower end surface, the upper end surface, and the outer peripheral surface) of third rotation shaft 53 based on the detection value of force sensor 62. However, CPU 71 may use torque commands Tm5*, Tm6*, and Tmh* for motors 56a, 57a, and 44 instead of the detection value of force sensor 62. CPU 71 may use torques Tm5, Tm6, Tmh of motors 56a, 57a, and 44. In a case where second rotation device 56, third rotation device 57, and lifting and lowering device 40 each include a torque sensor, torques Tm5, Tm6, and Tmh may be detected by these torque sensors. CPU 71 may use values obtained by subjecting slow change processing such as smoothing or rate processing to torque commands Tm5*, Tm6*, and Tmh* or torques Tm5, Tm6, and Tmh. CPU 71 may use torque commands Tm5*, Tm6*, and Tmh*, or torques Tm5, Tm6, and Tmh, change amounts $d\theta m5$ and $d\theta m6$ per unit time of rotation angles $\theta m5$ and $\theta m6$ of motors 56a and 57a detected by encoders 56b and 57b, and change amount dHs per unit time of lifting and lowering position Hs of base 25 detected by encoder 45.

Figure 5:
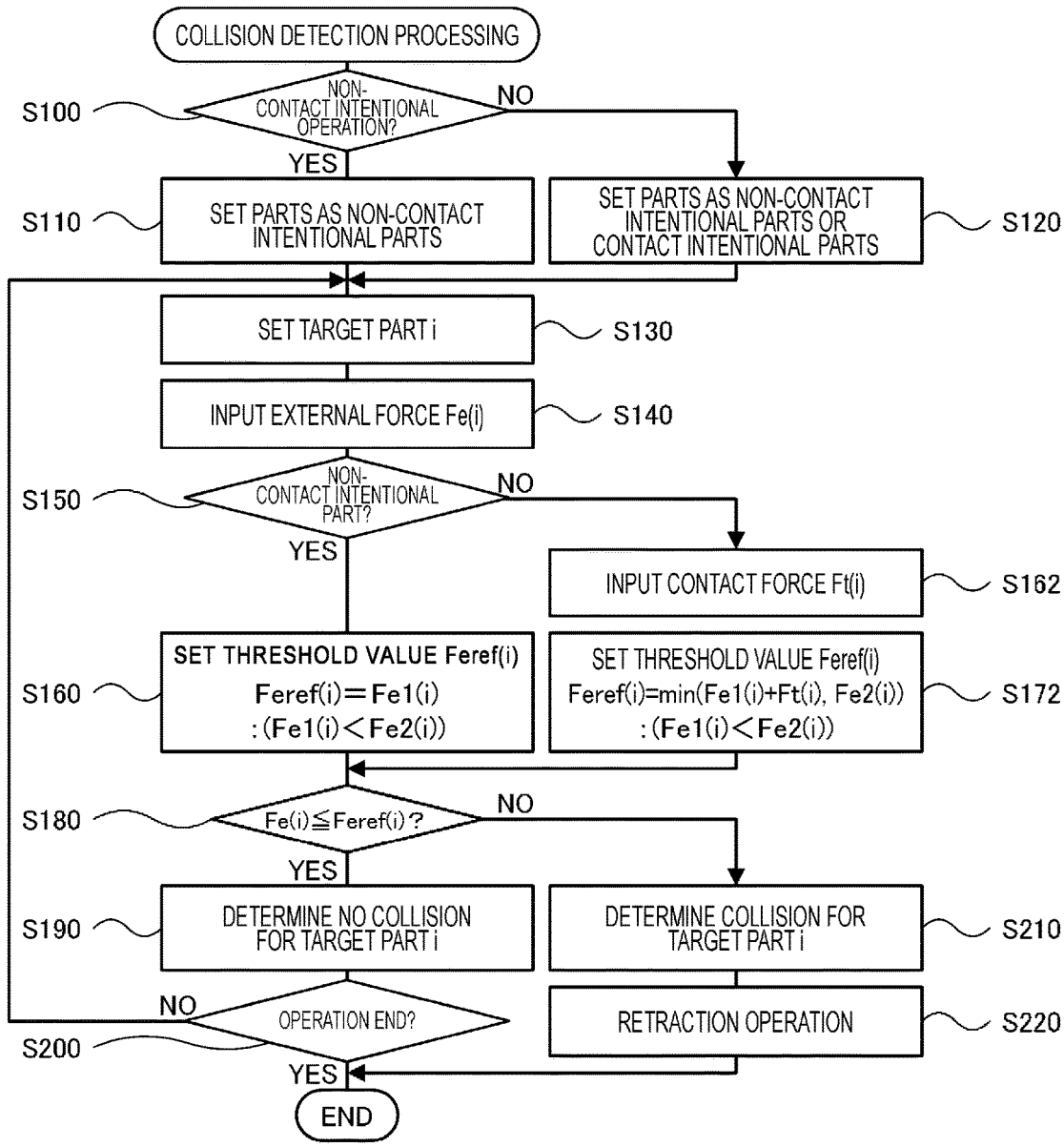
FIG. 5 is a flowchart illustrating an example of the collision detection processing.

In the above-described embodiment, CPU 71 executes the collision detection processing in FIG. 4, but may also execute the collision detection processing in FIG. 5. The collision detection processing in FIG. 5 is different from the collision detection processing in FIG. 4 in that S162 is added and S170 is replaced with S172. In the collision detection processing in FIG. 5, in a case where CPU 71 inputs external force Fe(i) of target part i in S140 and determines that target part i is the contact intentional part in S150, CPU 71 inputs contact force Ft(i) (intended force) acting on target part i caused by the instruction operation among external forces Fe(i) acting on target part i from another object (S162), sets threshold value Feref(i) for target part i by adding contact force Ft(i) to value Fe1(i) and performing upper limit guard of the value with value Fe2(i) as shown in Equation (3) (S172), and executes processing from S180 onwards.

$$Feref(i) = \min(Fe1(i) + Ft(i), Fe2(i)) \qquad (3)$$

Here, a case where the lower end surface of third rotation shaft 53 is target part i and the contact intentional part will be described. In this case, external force Fe(i) acting on target part i is estimated using at least one of torque commands Tm5*, Tm6*, and Tmh* for motors 56a, 57a, and 44, and the detection value of force sensor 62, and contact force Ft(i) acting on target part i is estimated using the other of torque commands Tm5*, Tm6*, and Tmh*. Contact force Ft(i) acting on target part i may be estimated based on the instruction operation. In the collision detection processing in FIG. 5, by setting threshold value Feref(i) for target part i by Equation (3), it is possible to detect a collision with another object for target part i when the force excluding contact force Ft(i) from external force Fe(i) acting on target part i from another object, that is, collision force Ft(i) (unintended force) acting on target part i without being caused by the instruction operation among external forces Fe(i) is greater than value Fe1($i$) or when external force Fe(i) is greater than value Fe2($i$). This makes it possible to more appropriately detect the collision of target part i with another object.

In the above-described embodiment, CPU 71 divides first arm 21 into multiple parts (for example, parts on the front side and the rear side in the rotation direction), and uses each of external forces Fe to determine the presence or absence of a collision with another object. However, CPU 71 may determine the presence or absence of a collision with another object by using each of external forces Fe in multiple directions with respect to first arm 21 such as two directions in each axial direction of the X axis, the Y axis, and the Z axis or two directions around each axis. The same applies to second arm 22, first rotation shaft 51, second rotation shaft 52, and third rotation shaft 53.

In the above-described embodiment, CPU 71 determines the presence or absence of a collision for target part i while changing target part i with respect to the parts of the arm. However, CPU 71 may determine the presence or absence of a collision in parallel with respect to the parts of the arm.

In the above-described embodiment, in a case where CPU 71 detects a collision with another object for any of the parts of the arm, CPU 71 causes the arm to operate an operation in which external force Fe acting on the part where the collision is detected becomes small, more specifically, an operation in which the part where the collision is detected moves away from another object, as the retraction operation. However, CPU 71 may stop the arm in a case where a collision with another object is detected for any of the parts of the arm.

In the above-described embodiment, robot 20 includes first arm 21, second arm 22, base 25, base plate 26, first arm driving device 35, second arm driving device 36, orientation holding device 37, lifting and lowering device 40, three-axis rotation mechanism 50, holder 60, force sensor 62, and control device 70. However, the present embodiment is not limited thereto, and the robot may include an arm, a driving device that drives the arm, an external force detection section that detects external forces acting on parts of the arm from another object, and a control device. Further, the present embodiment is not limited to the form of a robot, and may be applied to a form of an arm control method.

In the robot of the present disclosure, the control device may set all of the parts to non-contact intentional parts that are not intended for contact with the other object in a case where the instruction operation is the non-contact intentional operation, and the control device may set the parts to the non-contact intentional parts or contact intentional parts that are intended for contact with the other object based on the instruction operation in a case where the instruction operation is the contact intentional operation, and switch the threshold value between the non-contact intentional parts and the contact intentional parts. In this way, it is possible to further suppress erroneous detection of a collision with another object for the parts of the arm.

In this case, the control device may set the threshold value for the contact intentional parts to a value greater than the threshold value for the non-contact intentional parts. The control device may set the threshold value in a case where each of the parts becomes the contact intentional part to a value greater than the threshold value in a case where each of the parts becomes the non-contact intentional part. In this case, the external force detection section may include a contact force detection section, which detects the external force acting from the other object caused by the instruction operation as a contact force or estimates the contact force based on the instruction operation in a case where each of the parts becomes the contact intentional part, and the control device may set the threshold value in a case where each of the parts becomes the contact intentional part to a value changed based on the contact force with respect to the threshold value in a case where each of the parts becomes the non-contact intentional part. In this way, the threshold value can be set more appropriately.

In the robot of the present disclosure, the control device may control the driving device so that the arm operates an operation in which the external force acting on a detection part where the collision with the other object is detected becomes small when the collision with the other object is detected for any part among the parts. In this way, the robot can be operated so that the external force acting from another object becomes small.

In the robot of the present disclosure, the external force detection section may include at least one of a force sensor and an estimation section that estimates the external force based on an output-related value related to an output of the driving device or a command-related value related to a command value of the driving device.

A method for controlling an arm according to the present disclosure is a method for controlling a driving device of the arm so that the arm operates in accordance with an instruction operation, the method including: a step (a) of detecting external forces acting on parts of the arm from another object; and a step (b) of detecting a collision with the other object for a part where the external force is greater than a threshold value among the parts, in which in the step (b), the threshold value is switched between a case where the instruction operation is a non-contact intentional operation that is not intended for contact with the other object and a case where the instruction operation is a contact intentional operation that is intended for contact with the other object.

In the method for controlling an arm of the present disclosure, when detecting a collision with another object for a part where the external force is greater than a threshold value among the parts of the arm, the threshold value is switched between a case where the instruction operation is a non-contact intentional operation that is not intended for contact with another object and a case where the instruction operation is a contact intentional operation that is intended for contact with another object. Accordingly, it is possible to suppress erroneous detection of a collision with another object for the parts of the arm.

INDUSTRIAL APPLICABILITY

The present disclosure can be applied to a robot manufacturing industry or the like.

REFERENCE SIGNS LIST

10: robot, 20: robot main body, 21: first arm, 22: second arm, 25: base, 26: base plate, 31: first joint shaft, 32: second joint shaft, 33: orientation holding shaft, 35: first arm driving device, 35a: motor, 35b: encoder, 36: second arm driving device, 36a: motor, 36b: encoder, 37: orientation holding device, 37a: motor, 37b: encoder, 40: lifting and lowering device, 41: slider, 42: guide member, 43: ball screw shaft, 44: motor, 45: encoder, 50: three-axis rotation mechanism, 51: first rotation shaft, 52: second rotation shaft, 53: third rotation shaft, 55: first rotation device, 55a: motor, 55b: encoder, 56: second rotation device, 56a: motor, 56b: encoder, 57: third rotation device, 57a: motor, 57b: encoder, 60: holder, 62: force sensor, 70: control device, 71: CPU, 72: ROM, 73: RAM, T: tool

The invention claimed is:

1. A robot comprising:
an arm;
a driving device configured to drive the arm;
an external force detection section configured to detect external forces acting on parts of the arm from another object; and
a control device configured to control the driving device so that the arm operates in accordance with an instruction operation,
wherein the control device is configured to
determine whether the instruction operation is a non-contact intentional operation that is not intended for contact with the another object, or a contact intentional operation that is intended for contact with the another object,
when the instruction operation is the non-contact intentional operation, set all of the parts of the arm to non-contact intentional parts that are not intended for contact with the another object,
when the instruction operation is the contact intentional operation, set the parts of the arm to the non-contact intentional parts or contact intentional parts that are intended for contact with the another object,
set a target part for determining a presence or absence of a collision with the another object among the parts of the arm,
input the external force acting on the target part from the another object from the external force detection section,
when the target part is the non-contact intentional part, set a threshold value for collision determination for the target part to a first value,
when the target part is the contact intentional part, set the threshold value for collision determination for the target part to a second value, the second value being greater than the first value,
compare the external force acting on the target part from the another object with the threshold value,
when the external force acting on the target part from the another object is less than or equal to the threshold value, determine that there is no collision between the target part and the another object, and
when the external force acting on the target part from the another object is greater than the threshold value, determine that there is a collision between the target part and the another object, and execute a retraction operation of the target part away from the another object.

2. The robot according to claim 1,
wherein the external force detection section includes a contact force detection section, which detects a contact force acting on the target part from the another object caused by the instruction operation among the external forces or estimates the contact force acting on the target part from the another object based on the instruction operation, and
when the target part is the contact intentional part, the control device is configured to set the threshold value to a minimum of a sum of the first threshold value and the contact force, or the second threshold value.

3. The robot according to claim 1,
wherein the external force detection section includes at least one of a force sensor and an estimation section configured to estimate the external force based on an output-related value related to an output of the driving device or a command-related value related to a command value of the driving device.

4. A method for controlling an arm configured to control a driving device of the arm so that the arm operates in accordance with an instruction operation, the method comprising:
determining whether the instruction operation is a non-contact intentional operation that is not intended for contact with the another object, or a contact intentional operation that is intended for contact with the another object;
when the instruction operation is the non-contact intentional operation, setting all parts of the arm to non-contact intentional parts that are not intended for contact with the another object;
when the instruction operation is the contact intentional operation, setting the parts of the arm to the non-contact intentional parts or contact intentional parts that are intended for contact with the another object;
setting a target part for determining a presence or absence of a collision with the another object among the parts of the arm;
inputting the external force acting on the target part from the another object;
when the target part is the non-contact intentional part, setting a threshold value for collision determination for the target part to a first value;
when the target part is the contact intentional part, setting the threshold value for collision determination for the target part to a second value, the second value being greater than the first value;
comparing the external force acting on the target part from the another object with the threshold value;
when the external force acting on the target part from the another object is less than or equal to the threshold value, determining that there is no collision between the target part and the another object; and
when the external force acting on the target part from the another object is greater than the threshold value, determining that there is a collision between the target part and the another object, and executing a retraction operation of the target part away from the another object.

5. The robot according to claim 1, wherein the arm includes a first arm, a second arm coupled to a tip end portion of the first arm, and a three-axis rotation mechanism coupled to a tip end portion of the second arm.

* * * * *